(12) United States Patent
Peters

(10) Patent No.: US 10,080,359 B2
(45) Date of Patent: Sep. 25, 2018

(54) FOWL MANAGEMENT SYSTEM

(71) Applicant: Norman Lee Peters, Modesto, CA (US)

(72) Inventor: Norman Lee Peters, Modesto, CA (US)

(*) Notice: Subject to any disclaimer, the term of this patent is extended or adjusted under 35 U.S.C. 154(b) by 0 days.

(21) Appl. No.: 15/448,544

(22) Filed: Mar. 2, 2017

(65) Prior Publication Data

US 2017/0265453 A1 Sep. 21, 2017

Related U.S. Application Data

(63) Continuation of application No. 14/673,708, filed on Mar. 30, 2015, now Pat. No. 9,615,567, which is a continuation of application No. 13/755,915, filed on Jan. 31, 2013, now abandoned.

(51) Int. Cl.
*A01M 29/26* (2011.01)
*A01K 3/00* (2006.01)
*E04B 1/72* (2006.01)

(52) U.S. Cl.
CPC .......... *A01M 29/26* (2013.01); *A01K 3/005* (2013.01); *E04B 1/72* (2013.01)

(58) Field of Classification Search
CPC .......... A01K 3/00; A01K 3/005; A01K 3/006; A01K 13/006; E04B 1/72
See application file for complete search history.

(56) References Cited

U.S. PATENT DOCUMENTS

| | | |
|---|---|---|
| 731,890 A | 6/1903 | Green |
| 774,582 A | 11/1904 | Greer |
| 2,015,615 A | 9/1935 | Caplinger |
| 4,154,430 A | 5/1979 | Pfarr, Jr. |
| 4,260,137 A | 4/1981 | Laurenz |
| 4,602,764 A | 7/1986 | Cacicedo |
| 4,937,988 A | 7/1990 | Gratton |
| 5,092,088 A | 3/1992 | Way |
| 5,267,724 A | 12/1993 | Heath et al. |
| 5,476,062 A | 12/1995 | Ondris et al. |
| 5,606,830 A | 3/1997 | Townsend et al. |
| 5,713,160 A | 2/1998 | Heron |
| 5,845,607 A | 12/1998 | Kastner et al. |
| 5,918,404 A | 7/1999 | Ohba |
| 5,957,434 A | 9/1999 | Nilsson |
| 6,044,595 A | 4/2000 | Snow |
| 6,289,639 B1 | 9/2001 | Robertson |
| 6,341,550 B1 | 1/2002 | White |
| 6,371,054 B1 | 4/2002 | Celata et al. |
| 6,418,674 B1 | 7/2002 | Deraedt |
| 6,563,055 B1 | 5/2003 | Burdick |
| 6,880,811 B2 | 4/2005 | Burdick |
| 6,918,214 B2 | 7/2005 | Sabine |
| 2004/0200439 A1 | 10/2004 | Thomas et al. |
| 2005/0082085 A1 | 4/2005 | Burdick |
| 2009/0050862 A1 | 2/2009 | Cruce |
| 2012/0124918 A1 | 5/2012 | Zimmerman |

*Primary Examiner* — Beth A Stephan
(74) *Attorney, Agent, or Firm* — Loza & Loza, LLP; George Tseng

(57) ABSTRACT

A fowl management system is provided. The fowl management system includes a protected surface; a wire mesh at least partially suspended above the protected surface; wherein at least a portion of the wire mesh conducts an electrical current; a fence charger attached to the wire mesh; and a power source attached to the protected surface.

10 Claims, 8 Drawing Sheets

FOWL MANAGEMENT SYSTEM

FIELD OF INVENTION

The present invention is directed to a system and method for reducing and/or eliminating fowl waste from a protected surface.

BACKGROUND

Many times, fowl, and/or animals dispose of their excrement and other waste on top of a roof or other structure. For example, they might sit on top of a roof or other structure for a sufficient amount of time to drop excrement. The presence of this excrement and other waste may compromise the roof's (or other structure's) integrity. This may even lead to the roof and/or the structure to collapse. For example, the weight of the excrement and/or waste on the roof may cause the roof to collapse. Additionally, cleaning the waste and/or excrement may be extremely burdensome and expensive. Presence of the waste and/or excrement may pose certain health hazards. As such, a system and method for reducing/preventing and/or eliminating fowl and/or animal excrement and/or other waste is needed.

SUMMARY OF INVENTION

A fowl management system is provided. The fowl management system includes a protected surface; a wire mesh at least partially suspended above the protected surface, wherein at least a portion of the wire mesh conducts an electrical current; a fence charger attached to the wire mesh; a power source attached to the protected surface; wherein at least a portion of the protected surface and at least a portion of the wire mesh are parallel or substantially parallel to each other. Preferably, the protected surface is a roof. Preferably, the protected surface comprises at least one side connector attached to at least a portion of the protected surface and at least a portion of the wire mesh, wherein the wire mesh is at least partially suspended above the protected surface via the side connector. The fowl management system may further comprise at least one corner connector attached to at least a portion of the protected surface and at least a portion of the wire mesh, wherein the wire mesh is at least partially suspended above the protected surface via the corner connector.

Preferably, the fowl management system further comprises one or more insulators, wherein the insulator is attached to the side connector or the corner connector. Preferably, the fowl management system further comprises a means for grounding the fowl management system.

In a preferred embodiment, a fowl management system is provided. The fowl management system includes a protected surface and a wire mesh at least partially suspended above the protected surface. Preferably, at least a portion of the wire mesh conducts an electric current. Preferably, the protected surface is a man-made structure.

In a preferred embodiment, a kit is provided. Preferably, the kit includes the fowl management system described herein and instructions for use.

In a preferred embodiment, a method for reducing or eliminating fowl waste from a protected surface, or preventing fowl from excreting on the protected surface, is provided. Preferably, the method includes the step of providing a fowl management system comprising: a wire mesh at least partially suspended above the protected surface; a fence charger attached to the wire mesh; a power source attached to the protected surface; at least one insulator attached to the wire mesh wherein the protected surface and the wire mesh are parallel or substantially parallel to each other. Preferably, the method may further comprise the step of: providing fowl an electric shock if they make contact with the wire mesh; thereby preventing fowl from sitting on the roof top long enough to excrete.

BRIEF SUMMARY OF DRAWINGS

The invention may be more readily understood by referring to the accompanying drawing in which.

DETAILED DESCRIPTION OF INVENTION

Figure 1:
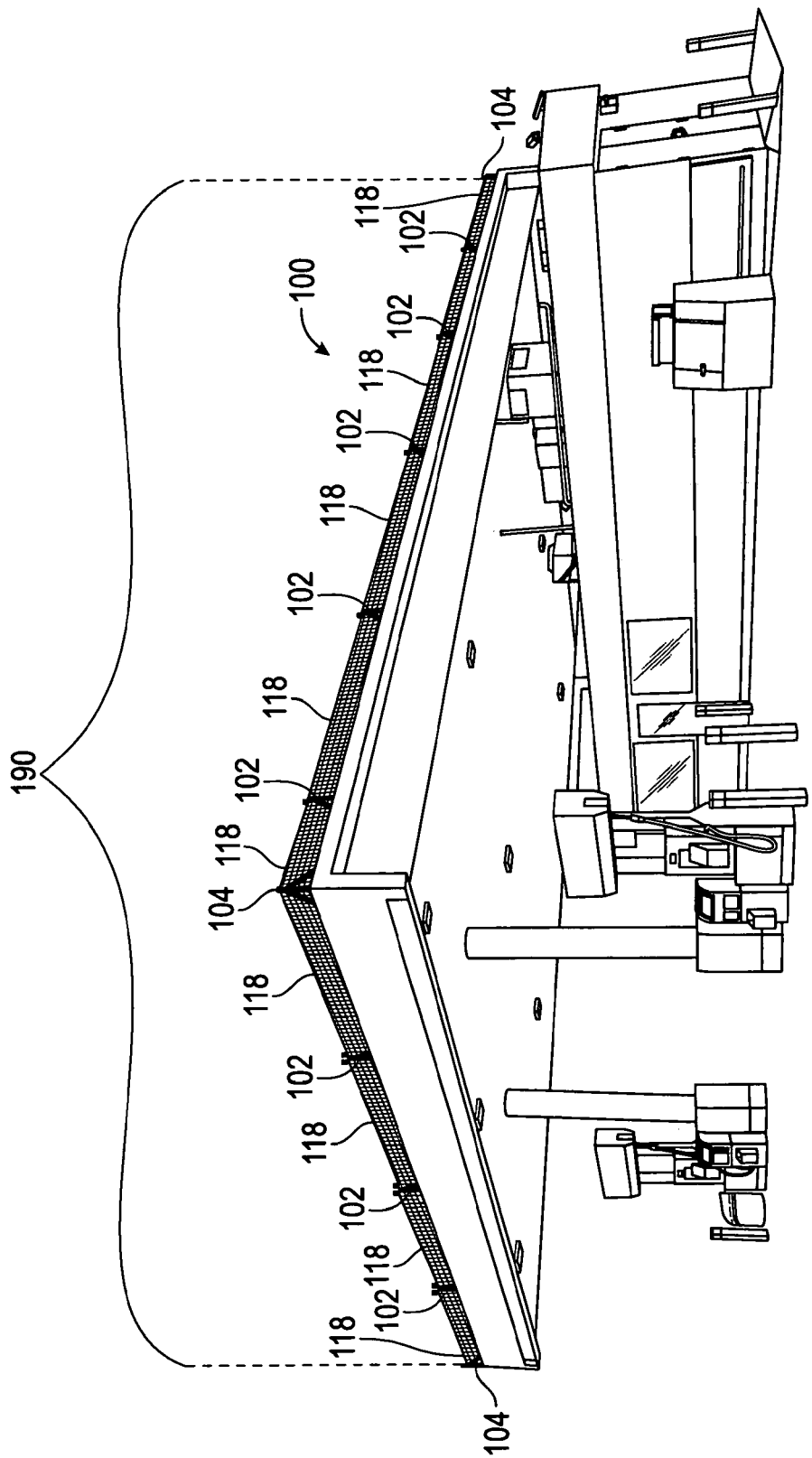
FIG. 1 is a perspective view of a fowl management system configured in accordance with a preferred embodiment of the present invention.

It will be appreciated that terms such as "front," "back," "top," "bottom," "left," "right," "horizontally," "up," "down," "upwardly," "downwardly," and/or "side," used herein are merely for ease of description and refer to the orientation of the components as shown in the figures. It is to be understood that any orientation of the fowl management system, and the components thereof described herein, is within the scope of the present invention.

As used herein, "fowl" may refer to birds (i.e., pigeons) and/or any other animals.

As used herein, "waste" and/or "excrement" may refer to waste and/or excrement or other matter from any source, including birds and other animals. It may also refer to plant matter, or the like without departing from the scope of the invention.

As used herein, "plurality" refers to one or more.

As used herein, "protected surface" may refer to a surface that is to be protected from fowl or animal excretion/waste using the fowl management system of the present invention. For example, it may refer to a surface on a structure such as a roof (i.e., roof top) that is to be protected from fowl excrement and/or waste. As such, "protected surface" may refer to any surface that is generally a surface where fowl land/congregate and/or a place where fowl drop waste and where waste accumulates. It is to be understood that at least a portion of protected surface includes a place where waste accumulates (and is able to accumulate). Preferably, protected surface is a man-made structure (or at least partially man-made structure); however, it need not be. Preferably, "protected surface" is parallel or substantially parallel to the ground. (In this regard, waste is able to accumulate on the protected surface). However, protected surface as used herein need not be parallel or substantially parallel to the ground. For example, "protected surface" as used herein may be an awning of a building. "Protected surface" may also refer to a surface where fowl excrement/waste is disposed of. Preferably, "protected surface" as used herein is not soil/the ground itself and/or any other surface that is capable of biodegradation. As such, it follows that protected surface as used herein is preferably a "man-made" structure and/or surface and not, for example, simply the ground. In other embodiments, "protected surface" may the soil/ground itself. In yet other embodiments, "protected surface" may be a tree. In yet other embodiments, "protected surface" may be an awning, and/or slanted surface and/or mansard and/or canopy and/or building overhang and/or any commercial or industrial buildings, and the like. In other embodiments, "protected surface" may be landscaping, trees or the like.

As used herein, "attached" may refer to one component being joined or connected to another component either directly or indirectly, without departing from the scope of the present invention. For example, as used herein, one component may be attached to another component without actually making contact with that component. In this regard, a first component may be attached to a second component via a third component (or a fourth component, etc.) that is in-between the first component and the second component. Additionally, as used herein, "attached" may refer to a first component making contact with a second component, i.e., being engaged to each other and/or touching each other, or the like.

As used herein, "wire mesh" may refer to a single wire and/or cable, wherein at least a portion of the wire conducts and/or carries an electric current sufficient to slightly shock a bird/pigeon and/or is "hot." Additionally, as used herein, "wire mesh" may refer to at least two separate wires and/or cable, wherein at least one wire conducts electricity or is at least able to do so (i.e., "electric wire mesh" that is configured to conduct electricity), and wherein at least one wire does not conduct electricity, or is unable to do so (i.e., non-electric wire mesh that is not configured to conduct electricity). As used herein, "electric wire mesh" may refer to "energized control wire" and/"hot wire" or the like. As used herein, "wire mesh" and/or "non-electric wire mesh" may refer to "bird netting." As such, for ease of reference, for ease of reference, the entire ensemble of wires and/or cables in the system may be referred to herein as "wire mesh." It is understood that one or more wires/cables in the system may be capable of conducting electricity and/or capable of slightly shocking a bird.

As used herein, "fence charger" may refer to any power supply for electric wire and/or any charger. It may refer to a controller, or the like.

Referring to FIGS. 1-8, a preferred embodiment of a fowl management system 100 is shown and described. Generally, fowl management system 100 includes a plurality of connectors (referred to herein individually and collectively as "connectors 190"). Connectors 190 may include side connectors (referred to individually and collectively as "side connectors 102") attached to a protected surface 106, a plurality of corner connectors 104 (referred to individually and collectively as "corner connectors 104") attached to protected surface 106, a plurality of middle connectors 166 (referred to herein individually and collectively as "middle connectors 166"), and a wire mesh 108 suspended above protected surface 106 via side connectors 102 and corner connectors 104. Preferably, fowl management system 100 includes a plurality of chargers 132 (referred to herein singularly and collectively as "charges 132") and one or more power sources 134 (referred to singularly and collectively as "power sources 134"). Preferably, protected surface 106 is a roof; more preferably, protected surface 106 is a roof of a gas station. In this regard, as fowl land on wire mesh 108, they are slightly shocked and then preferably fly off, without having time to drop excrement onto protected surface 106. In this regard, protected surface is not weighed down by excrement.

In a preferred embodiment, wire mesh 108 may include electric wire mesh 160 (as shown in FIGS. 3-5 and 7-8); non-electric wire mesh 162 (as shown in FIGS. 3-5 and 7-8); and perimeter cable 164 (shown in FIGS. 3-5 and 7-8).

Preferably, perimeter cable 164 (as used herein, may refer to "intermediate cable") serves as grounding wire. Preferably, non-electric wire mesh 162 is Bird Net 2000 (available from, but not limited to, Bird B Gone). Preferably, Bird Net 2000 is made from U.V.-stabilized polyethylene mesh and is available in various stock sizes and custom cuts up to 200 feet in length or width. Mesh sizes may be selected depending on the species of mesh bird. For example, a two-inch mesh may be used for seagulls and/or larger birds; 1⅛-inch mesh for starlings and pigeons; and ¾-inch mesh for all birds. Perimeter cable 164 may be standard construction cable. It may straining wire that is about 3/32" diameter and comprised of galvanized steel and/or stainless steel. In other embodiments, any other type and/or dimension and/or diameter of electric mesh 160; non-electric wire mesh 162; and/or perimeter cable 164, may be used without departing from the scope of the invention. In other embodiments, wire mesh 108 may be, but not limited to, smooth steel wire, aluminum wire, high tensile wire, poly wire (stainless steel wire strands woven with polyethylene), poly tape, and poly rope, and the like, and/or a combination of the same.

Figure 3:
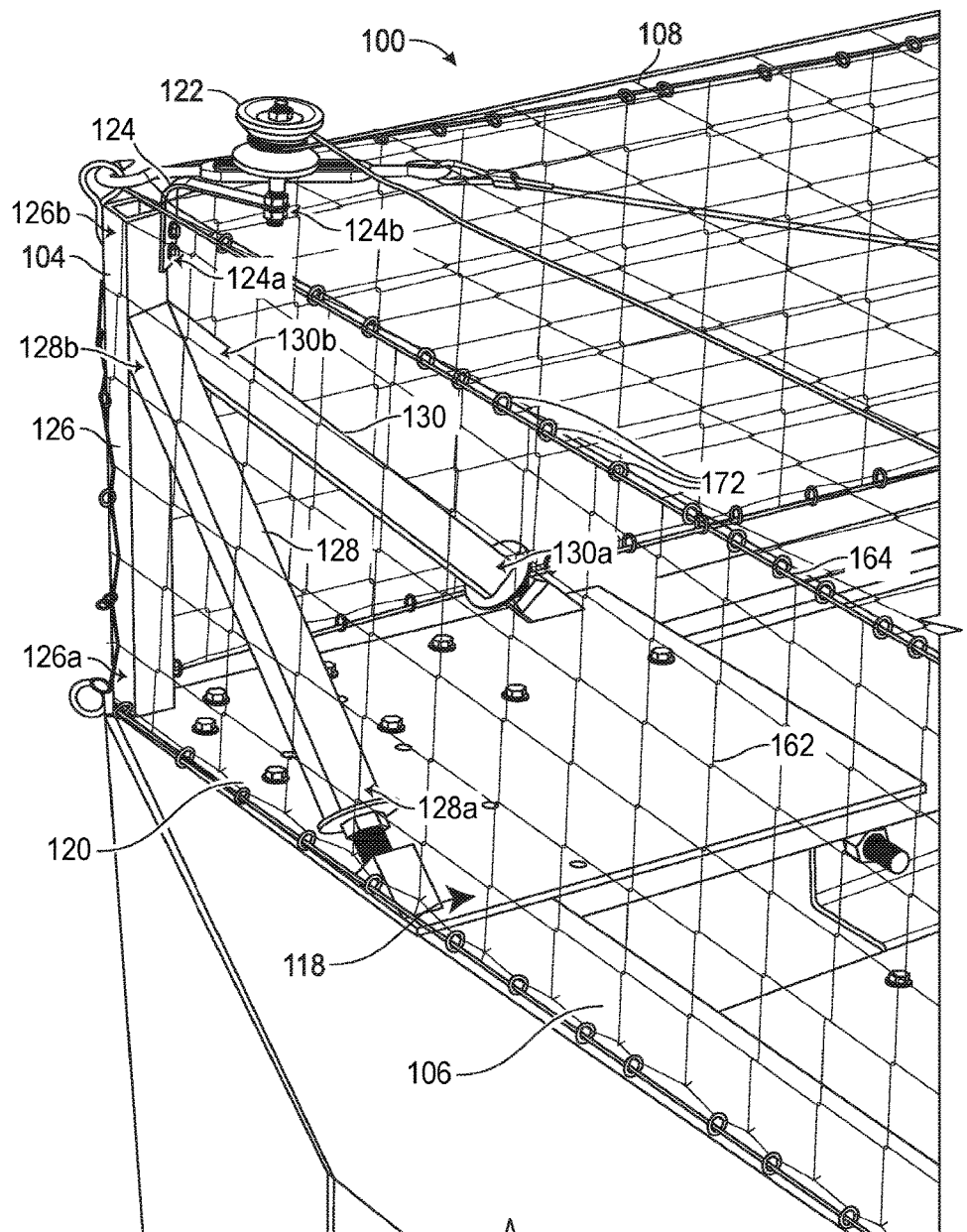
FIG. 3 is a perspective view detailing a corner connector of the fowl management system of FIG. 1 showing a corner connector.
Figure 5:
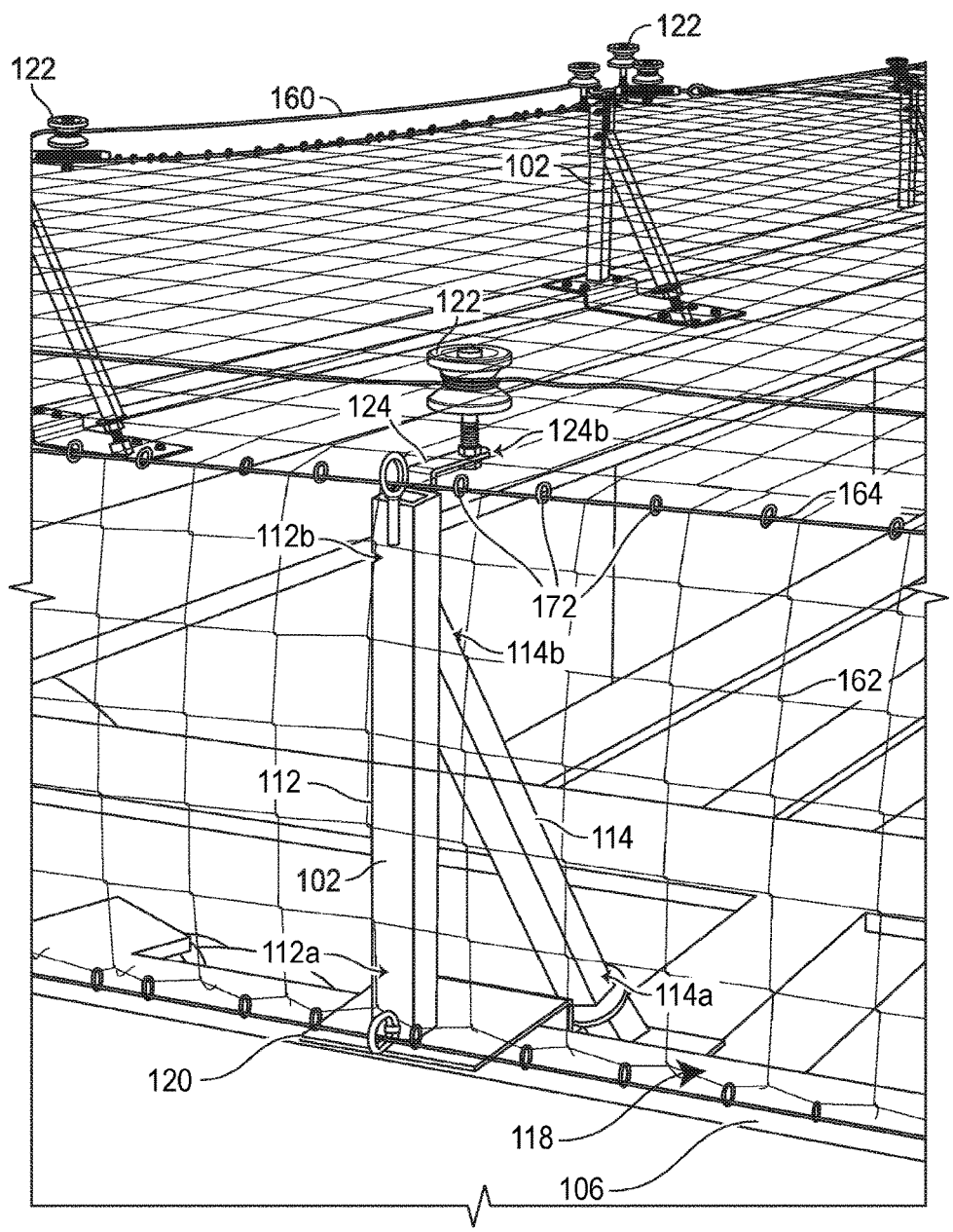
FIG. 5 is a perspective view detailing the side connectors of the fowl management system of FIG. 1.
Figure 8:
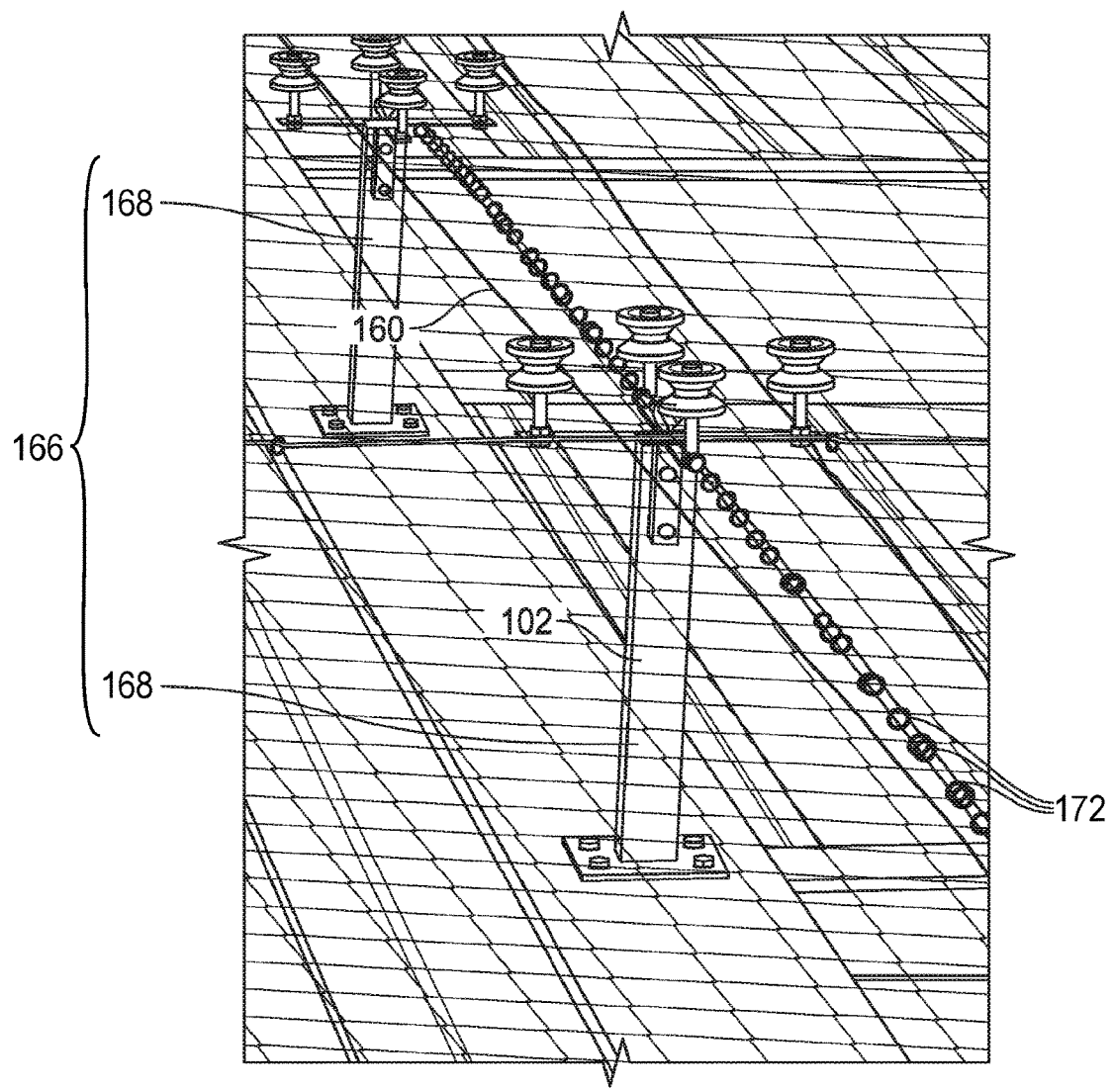
FIG. 8 is a perspective view detailing the middle connectors of the fowl management system of FIG. 1.

In a preferred embodiment, a plurality of hog rings 172 (referred to herein singularly and collectively as "hog rings 172", and shown in FIGS. 3, 5, and 8) may be used for attaching wire mesh 108 to perimeter cable 164 and/or any other component of the fowl management system 100 of the present invention. For example, hog rings 172 may attach wire mesh 108 and perimeter cable 164 by crimping a hog ring around both of the aforementioned. In other embodiments, hog rings 172 may be omitted and/or replaced by any other suitable structure.

In a preferred embodiment, turn buckles may be used to tighten wire mesh 108 in order to prevent sagging. In other embodiments, turn buckles are omitted and/or replaced by any other suitable structure.

Figure 2:
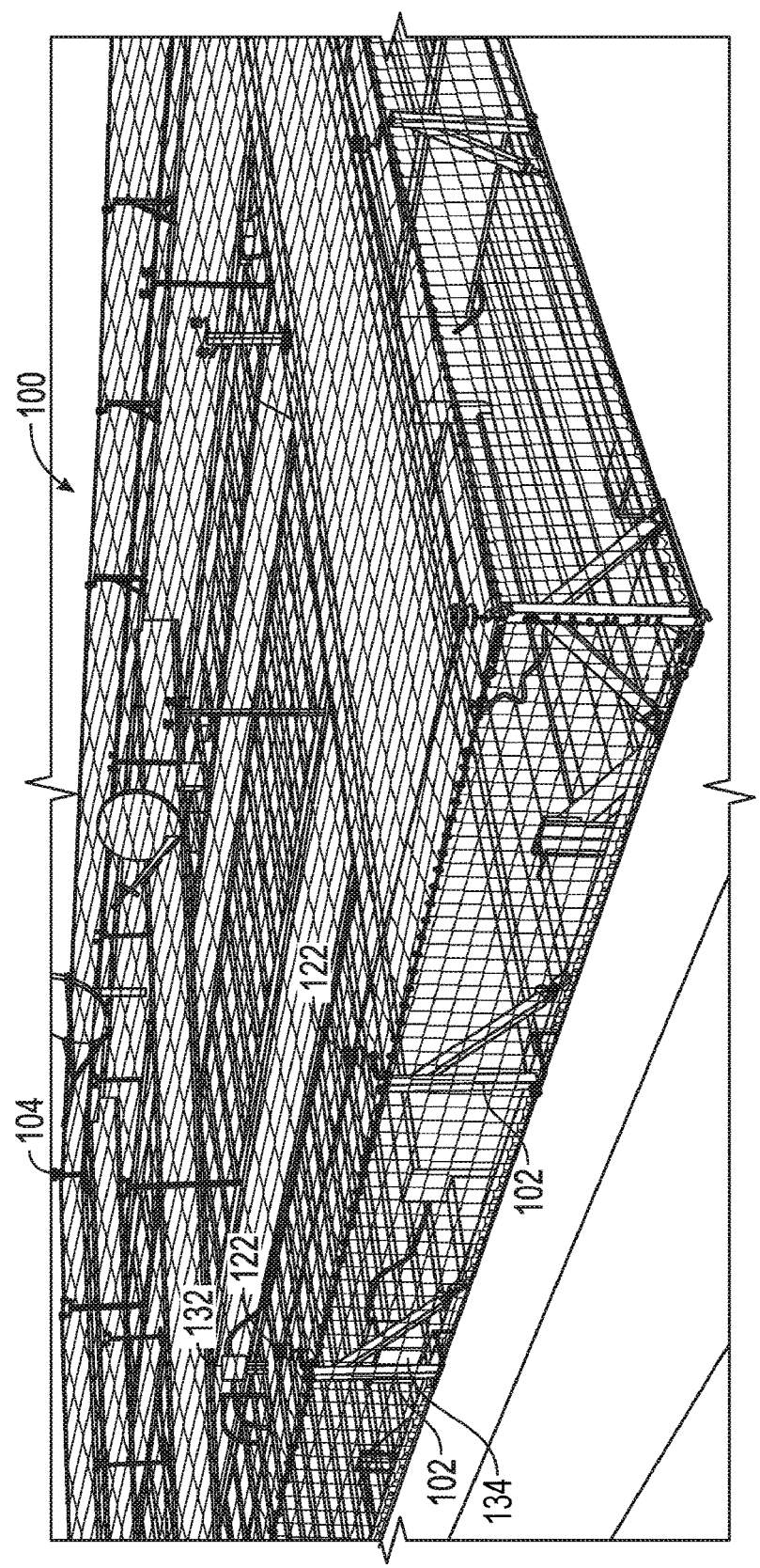
FIG. 2 is a perspective view of middle connectors, side connectors, and corner connectors of the fowl management system of FIG. 1.
Figure 6:
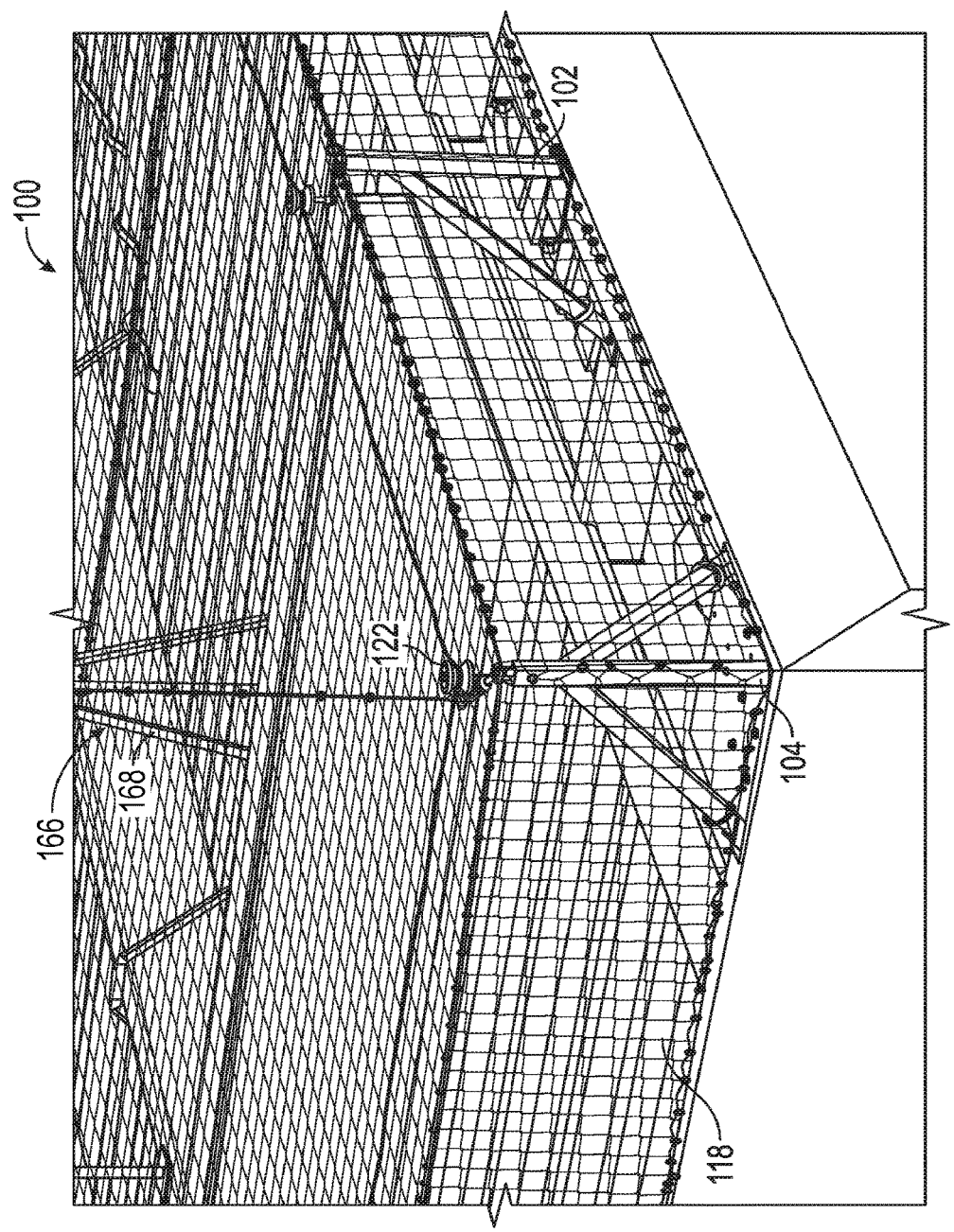
FIG. 6 is a perspective view of the side connector, the corner connector, and portions of middle connectors of the fowl management system of FIG. 1 showing other details.

In a preferred embodiment, protected surface 106 is enclosed by wire mesh 108 on top and on sides 118 (referred to herein singularly and collectively as "sides 118", and shown in FIGS. 1, 2, and 6). Preferably, sides 118 enclose protected surface 106. The enclosure may form a square or a rectangle and/or any other shape. In other embodiments, sides 118 may be omitted and/or do not enclose protected surface 106. For example, if sides 118 are omitted, then the top of wire mesh 108 may be suspended above protected surface 106 using one or more posts or the like.

In a preferred embodiment, fowl management system 100 of the present invention is installed on top of a gas station. In this way, it reduces and/or eliminates excrement/bird droppings and the like on top of the gas station. As such, the structural integrity of the gas station roof is not comprised (i.e., it does not get "weighed down" by the excrement). Additionally, it may be easier to clean the top of the roof when the system of the present invention is in use. In other embodiments, the invention is not installed on top of a gas station. For example, it may be installed on top of the roof of any other building or structure, or it may be installed on any other structure such as, but not limited to, ledges, signs, beams, pipes, chimneys, lights, trees, and the like. It is to be understood that fowl management system may be used to cover any surface and/or structure that suffers from bird droppings. Preferably, that surface and/or structure is a man-made surface and/or structure, but it is not limited to such.

In a preferred embodiment, the present invention includes a number of connectors 190, such as, side connectors, corner connectors, and/or middle connectors, for suspending wire mesh 108 above protected surface. It is to be understood, however, that side connectors, corner connectors, and/or middle connectors may be omitted and/or replaced by other suitable structures. Side connectors, corner connectors, and/or middle connectors may be used to suspend the wire mesh and/or hold insulators in place.

Figure 4:
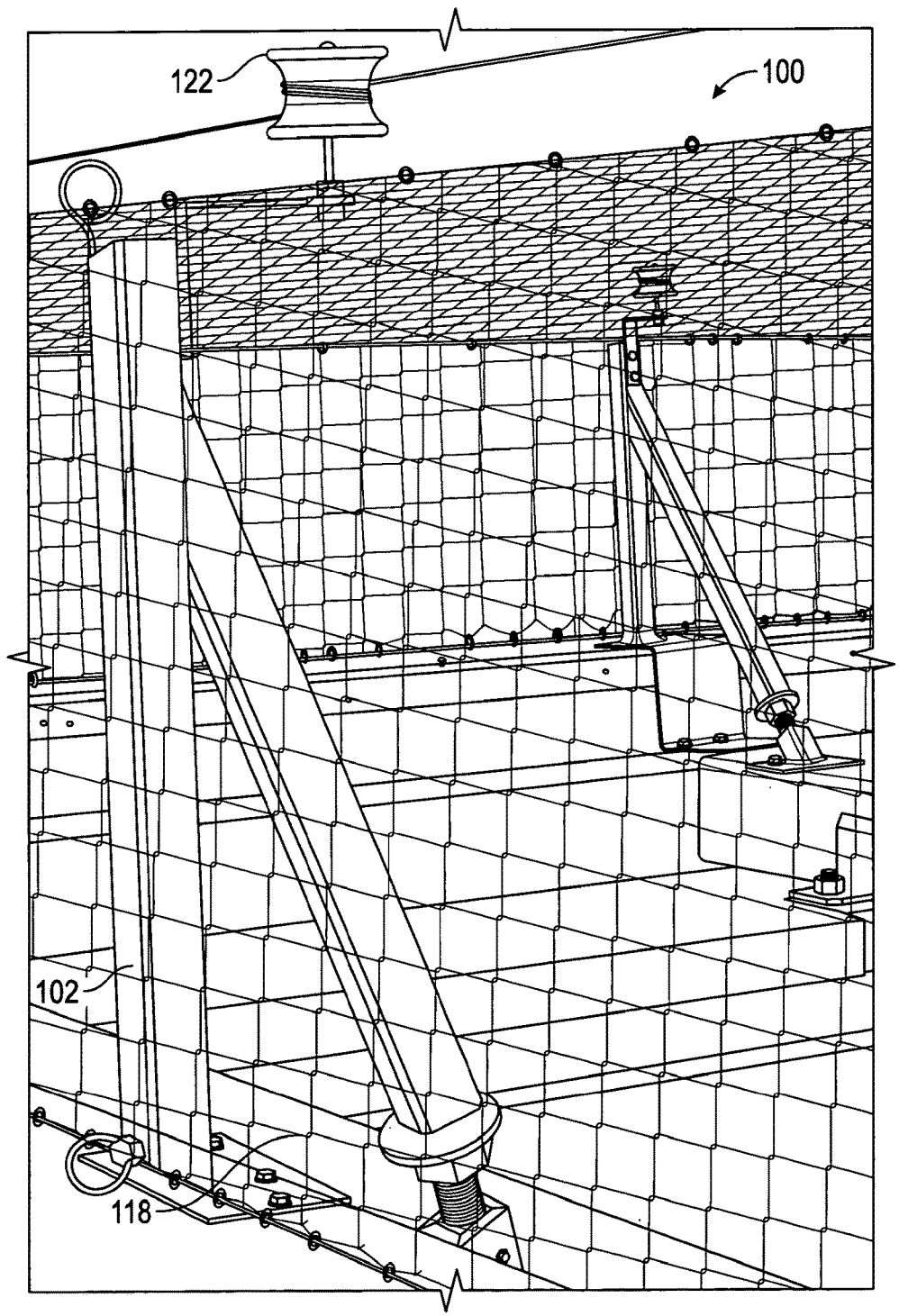
FIG. 4 is a perspective view detailing the side connectors of the fowl management system of FIG. 1.

In a preferred embodiment, and referring to FIGS. 1-2, and 5-7, fowl management system 100 includes a plurality of side connectors 102. Preferably, and as shown in FIG. 4, side connector 102 includes a first rod 112 and a second rod 114. Preferably, a first end 112*a* of first rod 112 is attached to side 118 via bracket 120, and a second end 112*b* of first rod 112 is attached to wire mesh 108. Preferably, a first end 114*a* of second rod 114 is attached to protected surface 106, and a second end 114*b* of second rod 114 is attached to first rod 112. Preferably, this configuration of side connector 102 provides the strength to keep wire mesh 108 raised above protected surface 106 (i.e., suspended above protected surface 106). Side connector 102 may also be referred to herein as "post." In other embodiments, side connector 102 is omitted and/or replaced by another suitable mechanism for keeping wire mesh 108 raised above a roof and/or a protected surface 106. In yet other embodiments, one or both ends of each of first rod 112 and/or second rod 114 may be attached to protected surface 106 and/or any other structure/component as long as wire mesh 108 is suspended above protected surface 106. In yet other embodiments, side connector 102 may be used in connection with another suitable mechanism for keeping wire mesh 108 above a roof and/or protected surface 106. In yet other embodiments, side connector 102 may be comprised of a single rod.

In a preferred embodiment, fowl management system 100 includes a plurality of corner connectors 104. As shown in FIG. 3, each corner connector 104 includes a first rod 126, a second rod 128, and a third rod 130. Preferably, corner connector 104 is attached to protected surface 106 via bracket 120. Preferably, first rod 126 includes a first end 126*a* and second end 126*b*. Preferably, first rod 126 is attached to bracket 120 on first end 126*a* and attached to wire mesh 108 on second end 126*b*. Preferably, second rod 128 includes a first end 128*a* and a second end 128*b*. Preferably, second rod 128 is attached to bracket 120 on first end 128*a* and is attached to first rod 126 on second end 128*b*. Preferably, third rod 130 includes a first end 130*a* and a second end 130*b*. Preferably, third rod 130 is attached to bracket 120 on first end 130*a* and is attached to first rod 126 on second end 130*b*. Preferably, each corner of roof includes a single corner connector 104. In other embodiments, corner connector 104 may not be comprised of first rod 126, second rod 128, and/or third rod 130 and/or each of ends 126*a*, 126*b*, 128*a*, 128*b*, and/or 130*a* and/or 130*b* may be attached to other components/surfaces. In yet other embodiments, corner connector 104 may be omitted and/or replaced by other suitable means of suspending wire mesh 108 and/or holding insulator 122. In yet other embodiments, not every corner will include corner connector 104 and/or some corners may have more than one corner connector 104.

In a preferred embodiment, as shown in FIG. 8, fowl management system 100 includes a plurality of middle connectors 166. As shown in FIG. 8, each middle connector 166 includes a plurality of rods 168. Preferably, middle connectors 166 suspend electric wire mesh 160 above protected surface 106. Preferably, one or more insulators 122 are attached to middle connectors 166. It is to be understood that any configuration of middle connectors 166 may be used. Middle connectors 166 may be placed/situated/located anywhere necessary and/or desired on protected surface 106. It is to be understood that middle connectors may be situated in any configuration. Placement of middle connectors 166 may be dictated by placement of wire mesh 108. For example, placement of middle connectors 166 may be dictated by desired placement/configuration of electric wire mesh 160. Preferably, at least one insulator 122 is attached to each middle connector 166. In other embodiments, middle connector 166 may be omitted and/or replaced by another suitable structure. In yet other embodiments, at least one insulator 122 is not attached to middle connector 166.

In a preferred embodiment, fowl management system 100 includes a plurality of insulators 122 (referred to herein singularly and collectively as "122"). Preferably, each side connector 102 has a single insulator 122, each corner connecter 104 has a single insulator 122, and each middle connector 166 has at least one insulator 122. Preferably each side connector 102 includes a single insulator 122 attached to a first end 112*a* of first rod 112. Preferably, insulator 122 is available from Red Snap'R™. Preferably, insulator 122 is connected to first end 112*a* of first rod 112 via a L-bracket 124 (not shown). Preferably, L-bracket 124 includes a first end 124*a* (not shown) and a second end 124*b* (not shown). Preferably, first end 124*a* is attached to side connector 102 and second end 124*b* is attached to insulator 122. In other embodiments, each side connector 102 may include more than one insulator 122. Preferably, insulator 122 is made of polyethylene or other plastic. Preferably, insulator 122 is attached to wire mesh 108 (and/or electric wire mesh 160 or non-electric wire mesh 162). In yet other embodiments, insulator 122 may be connected to any other component of fowl management system 100. In yet other embodiments, other types of insulators may be used. In yet other embodiments, insulator 122 is not comprised of polyethylene or other plastic and may be comprised of any other material. In other embodiments, side connectors 102, middle connectors 166, and/or corner connectors 104 may not include insulator 122.

In a preferred embodiment, side connectors 102 are spaced from about 5 feet to about 30 feet apart. More preferably, side connectors 102 are spaced from about 10 feet to about 25 feet apart, and most preferably, side connectors 102 are spaced from about 18 feet to about 22 feet apart. In other embodiments, side connectors 102 are less than about 18 feet apart and/or more than about 22 feet apart. The distance between side connectors 102 may vary depending on, for example, the surface/structure to be protected and/or the length of wire mesh 108.

Figure 7:
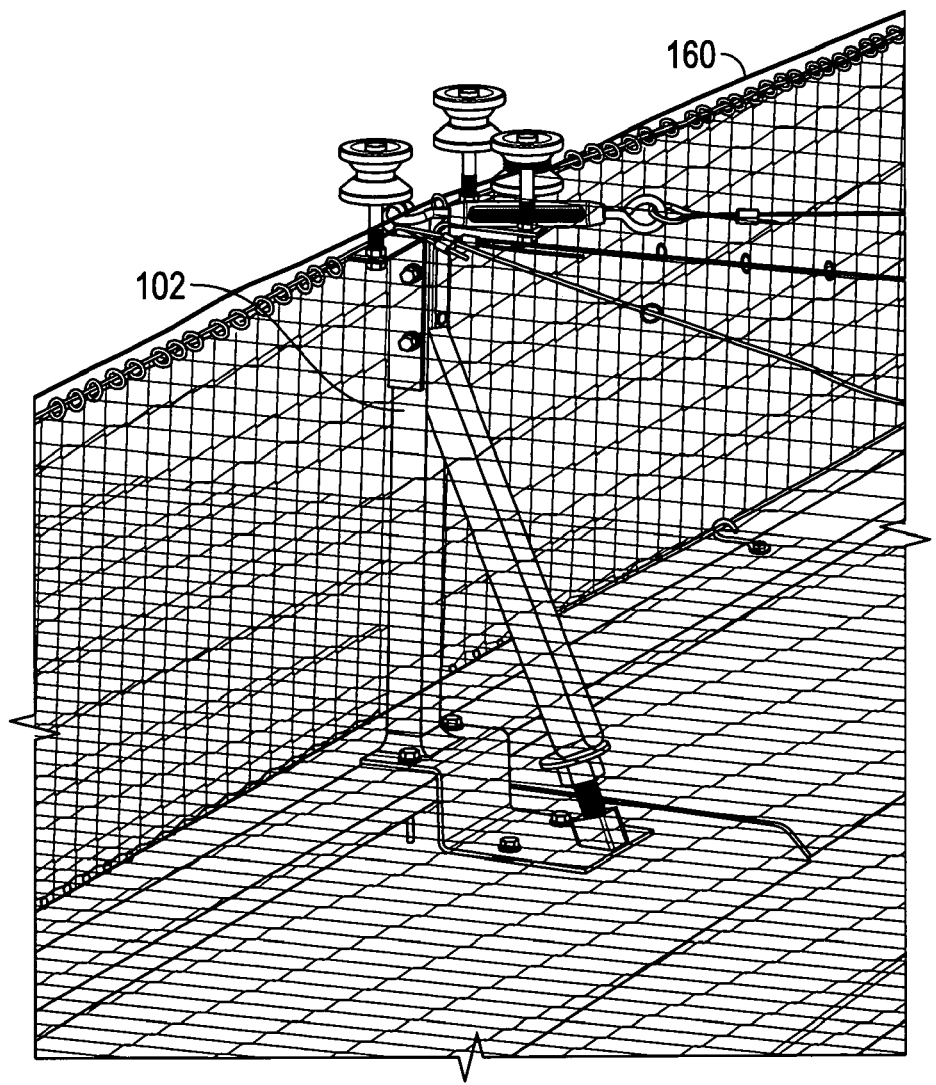
FIG. 7 is a perspective view of another configuration of a side connector of the fowl management system of FIG. 1.

In a preferred embodiment, each side connector 102 has a single insulator 122 and each corner connector 104 has a single insulator 122. In other embodiments, each side connector 102 and/or corner connector 104 may not have an insulator 122. In yet other embodiments, the distance between each side connector 102 may determine whether it includes a plurality of insulators 122 (as shown in FIGS. 7 and 8) or whether it does not include an insulator 122.

In a preferred embodiment, fowl management system 100 includes one or more fence chargers 132 (referred to herein singularly and collectively as "132"). Preferably, fence charger 132 provides the source of electric current that flows through wire mesh 108. The size/type of fence charger 132 may depend on desired current output, the length/size of fence, number of wires, power source (i.e., AC, DC, or solar). Preferably, fence charger 132 is available from Zarbera. Preferably, fence charger 132 is located at anywhere near the charger and/or fence charger 132 may be remote (i.e., indoor and/or outdoor). Preferably, fence charger 132 is AC-powered. In other embodiments, fence charger is omitted and/or replaced with another suitable mechanism. In other embodiments, fence charger 132 is solar and/or battery.

In a preferred embodiment, fowl management system 100 is grounded as is known in the industry.

In a preferred embodiment, the portion of wire mesh 108 that conducts electricity (or electric wire mesh 160) is placed in a cross-link pattern covering at least a portion of protected surface 106. In other embodiments, wire mesh 108 is not configured in a cross-link pattern and/or is only partially configured in a cross-link pattern. It is to be understood that the configuration of wire mesh 108 may be dictated by the size and type of structure to be protected and/or the extent of the fowl excrement problem.

In a preferred embodiment, wire mesh 108 is suspended above protected surface 106 from about 1 foot to about 10 feet; more preferably, from about 2 feet to about 8 feet; and most preferably, from about 3 feet to about 5 feet. In other embodiments, wire mesh 108 is suspended less than about 1 foot or greater than about 10 feet above protected surface 106. In yet other embodiments, wire mesh 108 (or a portion thereof) may make contact with protected surface 106. It is to be understood that wire mesh 108 and protected surface 106 are parallel and/or substantially parallel to each other. In this configuration, wire mesh 108 is able to cover and protect protected surface 106.

In a preferred embodiment, at least a portion of protected surface 106 and at least a portion of wire mesh 108 are parallel and/or substantially parallel to each other. In this regard, fowl management system 100 protects fowl excrement from dropping down and landing on protected surface 106. As such, it follows that protected surface is parallel or substantially parallel to the ground and/or earth's surface. It also follows that at least a portion of wire mesh 108 is suspended directly above protected surface 106. Preferably, wire mesh 108 is not simply a fence or the like. In other embodiments, wire mesh 108 and protected surface 106 are not parallel and/or substantially parallel to each other.

In a preferred embodiment, a kit comprising fowl management system 100 is provided. Preferably, the kit includes a plurality of side connectors 102, a plurality of corner connectors 104, a plurality of middle connectors 166, a plurality of insulators 122, a plurality of chargers 132, a plurality of power sources 134, a wire mesh 108, and instructions on use. It is to be understood however, that one or more of the components may be omitted from the kit and/or may be purchased separately.

In a preferred embodiment, fowl management system 100 of the present invention is installed as follows. Preferably, one or more fence chargers (or controllers) are placed in desired location(s). The "hot wire" and ground terminal may thereafter be installed. A weatherproof protective cover may be installed. Thereafter, an insulated 20,000 V lead-out controller wire (about 10-18 gauge) may be installed. Preferably, an insulated (600V to 20,000V) ground wire may be installed in desired location(s). An insulated (20,000V) 10-18 gauge jumper wire may be installed. The system may be grounded. Preferably, a disconnect switch is installed inside protective cover, as well as a caution and disconnect label. In other embodiments, one or more of the foregoing steps may be eliminated and/or replaced with another suitable step.

In a preferred embodiment, a method for reducing or eliminating fowl waste from a protected surface, or preventing fowl from excreting on the protected surface is provided. The method includes the step of providing the fowl management system of the present invention.

In a preferred embodiment, the invention may have a security shut-off switch and/or any other mechanism for shutting off the system.

The following example is presented to enable those skilled in the art to understand and practice the invention and to identify the presently preferred embodiments thereof. These examples are provided for illustrative purposes and not to indicate the scope of the invention, which is defined only by the appended claims.

EXAMPLE 1

A major gas station was having problems with fowl excrement on the top of its roof. The waste was removed. The fowl management system 100 of the present invention was installed. After installation, the roof was monitored every month. Birds landed on wire mesh 108, or electric wire mesh 160, and were slightly shocked; thereby "learning their lesson" and not coming back again.

From the foregoing detailed description, it will be evident that there are a number of changes, adaptations, and modifications, of the present invention, which come within the province of those skilled in the art. For example, the present invention includes all of the formulations disclosed herein. Further, the scope of the invention includes any combination of the elements from the different species, formulations, or embodiments disclosed herein, as well as subassemblies, assemblies, and methods of using and making thereof, and combinations of the various percentage ranges. It is intended that all such variations not departing from the spirit of the invention be considered as within the scope thereof.

What is claimed is:

1. A bracket assembly for mounting an anti-vermin apparatus to a protected surface comprising:
   a set of side supports, each comprising a pair of legs, wherein one of the pair of legs is affixed to an outer perimeter of the protected surface and another of the pair of legs is mounted to brace the side support against leaning towards a center portion of the protected surface, wherein the pair legs form an upside-down "V" shape comprising a joined end and an open side opposite the joined end;
   a set of corner supports, each comprising three legs joined at a common end to form a tripod-like structure, wherein a second end of a first of the three legs is configured to be affixed to a corner of the protected surface while two other legs of the three legs are mounted to brace the corner support against leaning towards the center portion of the protected surface;
   a plurality of brackets, each bracket being configured with a first end to be affixed to a respective support comprising one of: a) the side support at the joined end, or b) the corner support at the common end, wherein each bracket comprises a second end offset from the respective support, wherein together each of the plurality of brackets and the respective support form a plurality of support brackets;

a plurality of non-conductive mounts, each of which is attached to the second end of one of the plurality of brackets;

a first length of conductive wire attached to a set of the plurality of the non-conductive mounts to follow an outside border of the protected surface;

a second length of conductive wire affixed to a set of the plurality of support brackets to follow the outside border of the protected surface, wherein the second length of conductive wire is offset away from the first length of the conductive wire; and a mesh covering an area defined by the second length of conductive wire;

wherein one of the first length of conductive wire and the second length of conductive wire is configured to be attached to a power source and another one of first length of conductive wire and the second length of conductive wire is configured to be attached to an electrical ground.

2. The bracket assembly of claim 1, wherein the mesh, the first length of conductive wire, and the second length of conductive wire form a wire mesh comprising a first conductive portion upon which an animal may rest and a second conductive portion.

3. The bracket assembly of claim 2, further comprising a power supply configured to supply an electric charge running through at least one of the first conductive or the second conductive portions of the wire mesh, wherein the electric charge is grounded to the other at least one of the first conductive or the second conductive portions such that:

if the power supply is configured to supply an electric charge running through the first conductive portion then the electric charge is grounded to the second conductive portion through the animal, and if the power supply is configured to supply an electric charge running through the second conductive portion then the electric charge is grounded to the first conductive portion through the animal, wherein the animal receives a shock when the animal touches the second conductive portion while the animal is in contact with the first conductive portion.

4. The bracket assembly of claim 1, wherein at least one of the plurality of non-conductive mounts comprises a rounded rod oriented in a vertical fashion with a tapered portion formed between a top and bottom portions of the rounded rod, and wherein at least a portion of the first length of conductive wire is wound around the tapered portion.

5. The bracket assembly of claim 1, wherein the protected surface comprises a roof surface.

6. The bracket assembly of claim 1, wherein the support bracket is configured to suspend at least a portion of the mesh away from contacting the protected surface.

7. The bracket assembly of claim 1, wherein at least one of the non-conductive mounts further comprises at least one insulator, wherein the at least one insulator is configured to electrically isolate the first length of conductive wire from the protected surface.

8. The bracket assembly of claim 1, wherein the mesh comprises an electrically non-conductive portion.

9. The bracket assembly of claim 7, wherein the electrically non-conductive portion comprises a netting.

10. The bracket assembly of claim 1, wherein one of the first length of conductive wire and the second length of conductive wire is further configured to be a perch.

* * * * *